United States Patent [19]
Thompson et al.

[11] Patent Number: 4,872,638
[45] Date of Patent: Oct. 10, 1989

[54] SLOW ACTING FLUID VALVE

[75] Inventors: Raymon F. Thompson; Larry Funk, both of Kalispell, Mont.

[73] Assignee: Semitool, Inc., Kalispell, Mont.

[21] Appl. No.: 150,383

[22] Filed: Jan. 29, 1988

[51] Int. Cl.[4] .................. F16K 31/126; F16K 31/122
[52] U.S. Cl. ..................................... 251/54; 251/61.4; 251/61.5; 251/122; 251/331; 251/333; 251/335.2; 251/360
[58] Field of Search ................. 251/48, 54, 61.2, 61.5, 251/331, 335.2, 121, 122, 333, 357, 360

[56] References Cited

U.S. PATENT DOCUMENTS

| | | | |
|---|---|---|---|
| 1,115,244 | 10/1914 | Reynolds | 137/513.3 |
| 1,223,326 | 4/1917 | Marsh | 251/122 |
| 1,874,135 | 8/1932 | Spoor | 251/54 |
| 1,911,905 | 5/1933 | Knowlton et al. | 251/122 |
| 2,528,822 | 11/1950 | Dunn | 251/54 |
| 2,579,334 | 12/1951 | Plank | 251/54 |
| 2,655,041 | 10/1953 | Jacobsson | 251/122 |
| 2,675,204 | 4/1954 | Johnson | 251/335.2 |
| 2,985,424 | 5/1961 | Anderson et al. | 251/357 |
| 3,367,367 | 2/1968 | Moriyama | 251/54 |
| 3,620,251 | 11/1971 | Bowen | 251/333 |
| 3,661,175 | 5/1972 | Tillman | 137/513.3 |
| 3,730,215 | 5/1973 | Conery et al. | 251/54 |
| 3,732,889 | 5/1973 | Conery et al. | 251/54 |
| 3,850,405 | 11/1974 | White | 251/61.5 |
| 3,853,145 | 12/1974 | Judd | 251/54 |
| 4,180,239 | 12/1979 | Valukis | 251/335.2 |
| 4,535,967 | 8/1985 | Babbitt et al. | 251/54 |
| 4,721,284 | 1/1988 | Banhard | 251/61.5 |

FOREIGN PATENT DOCUMENTS

| | | | |
|---|---|---|---|
| 1182920 | 12/1964 | Fed. Rep. of Germany | 251/54 |
| 1299114 | 12/1962 | France | 251/54 |
| 0014679 | 2/1981 | Japan | 251/335.2 |

Primary Examiner—George L. Walton
Attorney, Agent, or Firm—Wells, St. John & Roberts

[57] ABSTRACT

A slow acting pneumatically operated valve which uses gas pressure and/or pneumatic pressure acting on a diaphragm to counteract the force of a coiled spring, thereby activating a double tapered fluorocarbon plastic poppet against a fluorocarbon plastic valve seat. Actuation of the poppet must be extremely slow and uniform such that fluid in the affected supply line does not experience shocks which can be transmitted to other supply line components. Actuation speed is restricted by use of a damping piston attached to the opposite end of the poppet stem, which restricts the flow of hydraulic fluid to opposite sides of the piston chamber during an actuation cycle. The double taper poppet incorporates an extremely low angle of incidence to the valve seat. Valve opening increases very slowly during the initial opening travel and decreases slowly during final closing travel, thereby further reducing the potential for fluid system shocks.

7 Claims, 5 Drawing Sheets

SLOW ACTING FLUID VALVE

BACKGROUND OF THE INVENTION

1. Field of the Invention

The present invention pertains to fluid handling components and semiconductor fabrication equipment, and more particularly, pertains to a slow acting valve for use in the same.

2. Description of Prior Art

Various slow operating valves exist in other applications. Normally these components are used in very large volume systems and consequently are large, bulky and often inappropriate for use in "clean room" conditions in front end semiconductor fabrication equipment.

Prior art valves often had system shocks which occurred with the sudden actuation of a contact valve. The system shock would often cause debris and other particles lodged in the attached system to be dislodged only to pollute the entire system. These particles subsequently migrated to the process areas and onto the product substrate resulting in low die yields.

Other slow operating valves have used relatively large electric motors to activate screw drives or lever arms, which in turn actuate sliding ball valves or tapered shafts through relatively large longitudinal or rotational travel. These factors all contribute to higher cost, decreased reliability and significant particle generation.

The present invention provides a particle free valve for fluid or gas supply lines to minimize supply system shocks, which tend to dislodge particles previously captured in the supply system's filtration components or other dormant areas.

SUMMARY OF THE INVENTION

The general purpose of the present invention is to provide a slow acting valve, especially for use in front end semiconductor fabrication equipment.

According to one embodiment of the present invention, there is provided a valve stem common to a damping piston, an actuating diaphragm, a sealing diaphragm and a double taper poppet. The valve body includes a cylinder cap, a valve seat and mating housings which encompass and form cylindrical chambers for the purpose of providing operating environments for the damping piston, the actuating diaphragm, the sealing diaphragm and the poppet. A valve seat below the valve seat housing accommodates the double taper poppet to close the slow acting valve. Damping of the movement of the valve stem by the damping piston provides for controlled motion of the attached poppet to allow slow operation of the poppet in the valve seat.

The slow acting valve incorporates a damping piston in which hydraulic fluid is securely isolated from delivery system fluids. The slow acting valve makes use of all fluorocarbon plastic components for actuating diaphragms, poppets and valve seats which come in contact with delivery system fluids. A distinguishing feature of the slow acting valve is the combination of a pneumatic diaphragm actuation with a damping piston. The damping piston, pneumatic diaphragm and poppet all reside on a common valve stem within a structured housing. The valve is pneumatically actuated by air or gas pressure on the pneumatic diaphragm, and hydraulically damped to operate a double taper poppet at a controlled rate in or out of a valve seat. This allows the valve to be extremely compact, reliable, and free of particle generation.

One significant aspect and feature of the present invention is a valve which minimizes fluid system shock during normal valve opening or closing. The valves include a damping piston, an actuating diaphragm, a sealing diaphragm and a poppet mounted on a common valve.

Another significant aspect and feature of the present invention is a hydraulic damping piston used to control valve speed. The valve has no valve play or flutter which assumes elimination of residual fluid system shocks.

A further significant aspect and feature of the present invention is the use of all Teflon components which come in contact with the delivery fluids.

Having thus described embodiments of the present invention, it is the principal object hereof to provide a slow acting valve which minimizes hydraulic system shock and particle contamination.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
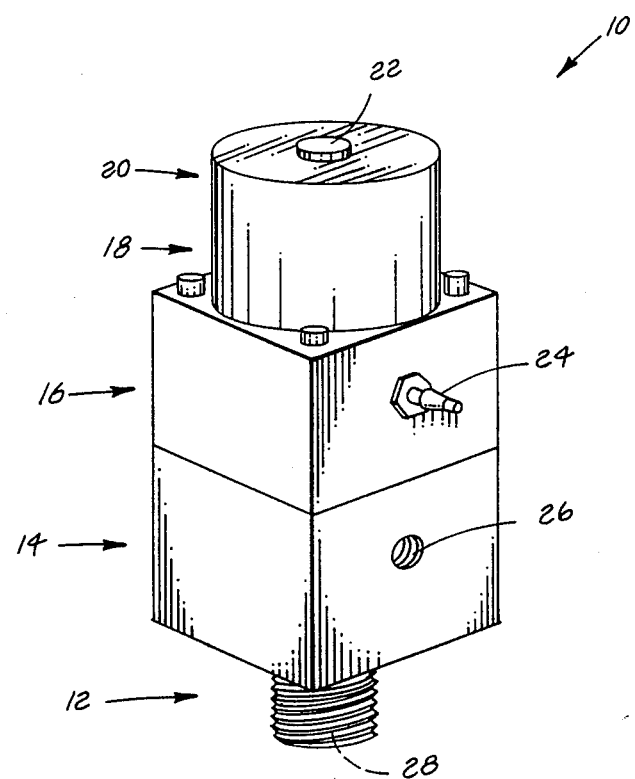
FIG. 1 illustrates a perspective View Of a slow acting valve, the present invention.

FIG. 1 illustrates a perspective view of a pneumatically operated, hydraulically damped, slow acting valve 10 for the uniform and smooth control. The slow acting valve 10 includes a threaded valve seat assembly 12 secured into a valve seat housing 14; an actuator housing 16 fitted onto a cylinder housing 18; a cylinder cap 20 fitted into the cylinder housing 18; a barb plug 22 in the top of the cylinder cap 20; and a barb 24 for pneumatic source actuation of the valve 10 fitted in the actuator housing 16. A threaded upper orifice 26 in the valve seat housing 14 provides for fluid to exit or enter the valve seat housing 14. A lower orifice 28 in the threaded valve seat assembly 12 provides for fluid to exit or enter the threaded valve seat assembly 12.

Figure 2:
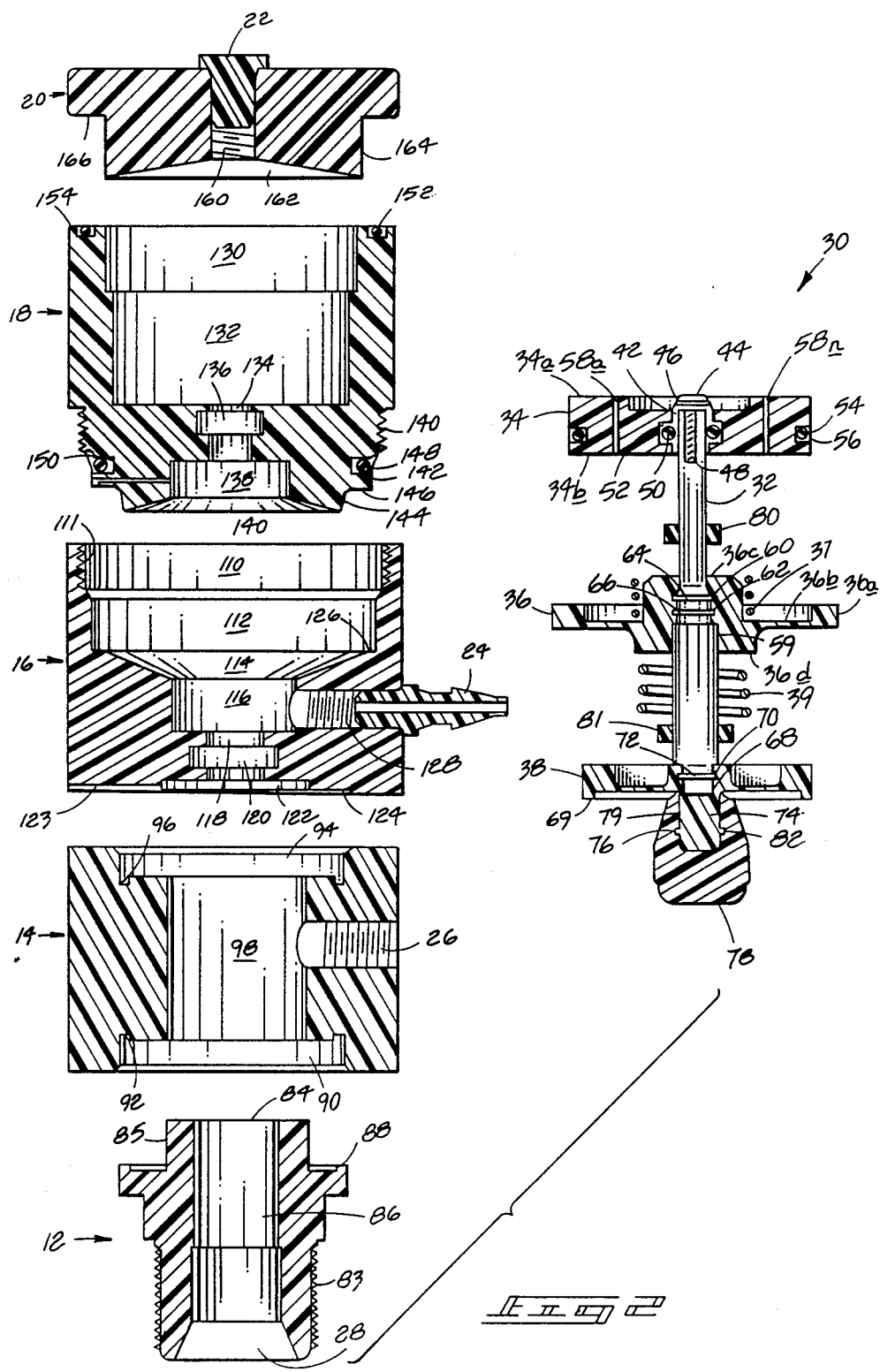
FIG. 2 illustrates an exploded sectional view of the components of the slow acting valve.

FIG. 2 illustrates an exploded sectional view of the components of FIG. 1 where all numerals correspond to those elements previously described. The valve stem assembly 30 includes a valve stem 32 as described in this figure, and is also further described in the assembled illustration found in FIG. 3. The multi-radiused valve stem 32 includes several annular rings upon which a fluorocarbon plastic damping piston 34, a fluorocarbon plastic actuating diaphragm 36, a fluorocarbon sealing diaphragm 38 and a double tapered fluorocarbon poppet 78 are mounted. A hole 42, in the center of the damping piston 34, positions over the upper end of the valve stem 32. The damping piston 3 secures at the upper end of the valve stem 32 by a screw 44 and corresponding washer 46 in hole 48 in the upper end of the valve stem 32. An O ring seal 50 fits in an annular groove 52 of the damping piston 34. An additional O ring 54 fits in an annular groove 56. A plurality of restrictor orifices 58a–58n extend vertically between the top surface 34a and the bottom surface 34b of the damping piston 34 for passage of hydraulic fluid as later described in detail. Configured hole 59, in the actuating diaphragm 36, engages the valve stem 32. Annular grooves 60 and 62 in the actuating diaphragm 36, engage annular rings 64 and 66 on the valve stem 32. The actuating diaphragm 36 also includes an annular seal 36a, membrane 36b, upper cylindrical member 36c and a lower cylindrical member 36d. A spring 37 fits over the upper cylindrical member 36c, and a spring 39 fits over the valve stem 32 beneath the lower cylindrical member 36d. A hole 68 in the sealing diaphragm 38 engages the valve stem 32 at its lower end, and secures thereto by an annular groove 70 which engages with an annular ring 72 on the lower end of the valve stem 32. An annular ring 69 at the outer edge of the sealing diaphragm 38 engages the valve seat housing 14 as later described in detail. The sealing diaphragm 38 includes a fluorocarbon cylindrical extension 74 with an annular ring 76. A double taper poppet 78 with interior hole 79 and an annular groove 82 engage the cylindrical extension 74 and annular ring 76. Quad O rings 80 and 81 affix over the valve stem 32 between the damping piston 34 and the actuating diaphragm 36, and between the actuating diaphragm 36 and sealing diaphragm 38, respectively. The double taper poppet 78 is further described in FIG. 4.

The valve enclosure shown in FIGS. 1 and 2 includes a valve seat assembly 12, a valve seat housing 14, an actuator housing 16, a cylinder housing 18 and a cylinder cap 20.

The threaded valve seat assembly 12 includes threads 83 and a circular valve seat 84 in a cylindrical body member which engages the double taper poppet 78 and an appropriately sized valve seat passageway 86 between the circular valve seat 84 and the lower orifice 28. An annular ring 88, concentric to the valve seat passageway 86, extends about the threaded valve seat assembly 12 for engagement with the valve seat housing 14.

Figure 3:
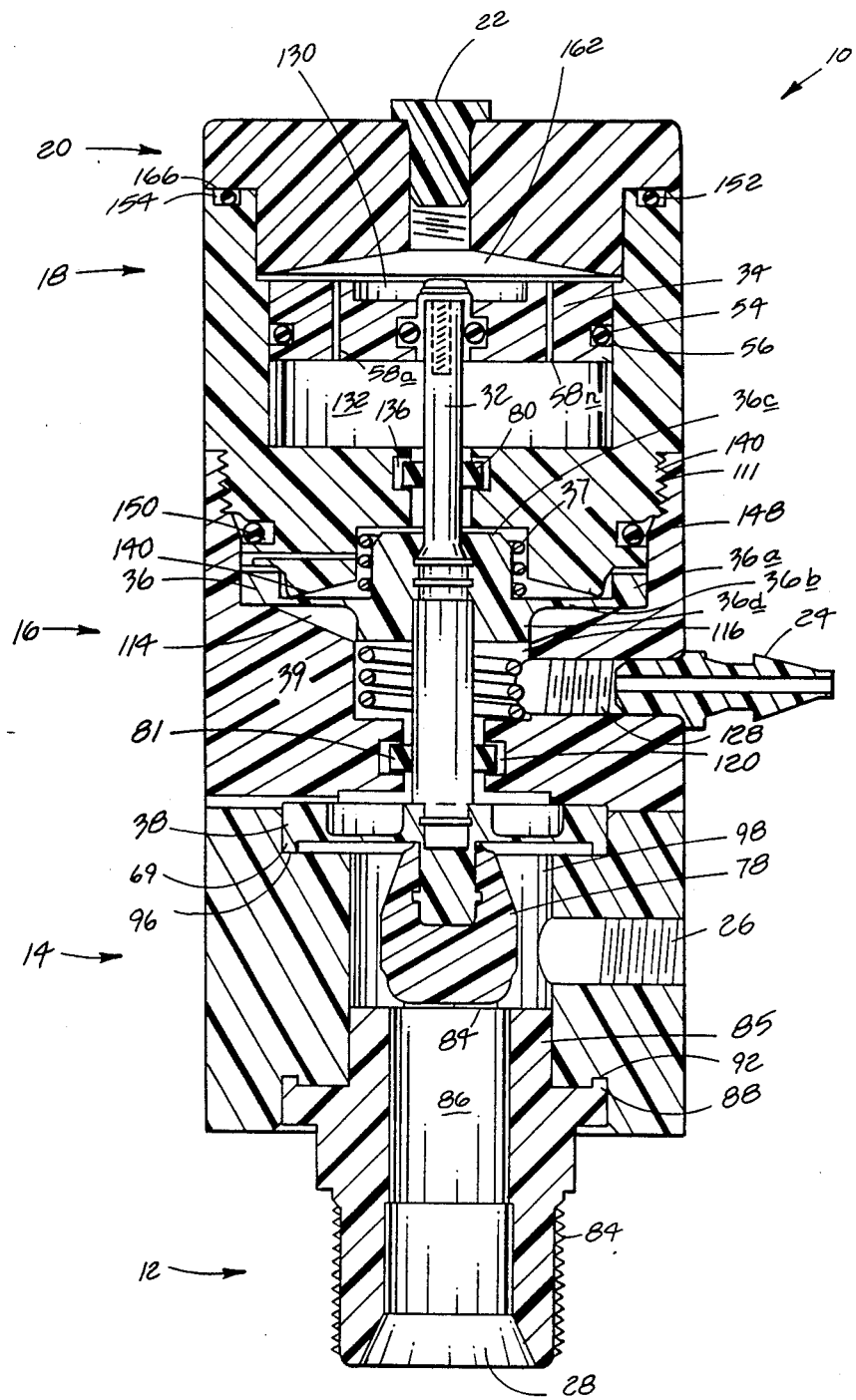
FIG. 3 illustrates a cross-sectional view of the slow acting valve in the actuated position.

The valve seat housing 14 includes a cylindrical cavity 90 and an annular groove 92 for the acceptance of the annular ring 88 of the threaded valve seat. Another cylindrical cavity 94, at the upper end of the valve seat housing 14, also includes an annular groove 96 for the acceptance of the annular ring 69 of the sealing diaphragm 38. A cylindrical passageway 98 extends between the cylindrical cavity 90 and the cylindrical cavity 94 to accommodate the double taper poppet 78, as illustrated in FIG. 3. A threaded orifice 26 intersects the cylindrical passageway 98 for the entry or exiting of fluid being controlled.

The actuator housing 16 includes a plurality of concentric vertically spaced cylindrical or conical chamber segments, and includes the upper cylindrical chamber segment 110, threads 111 on the inner surface of the upper cylindrical chamber segment 110, cylindrical chamber segment 112, conical chamber segment 114, spring chamber segment 116, hole 118, annular groove 120, cylindrical chamber 122, a vent passage 123, and a diaphragm seat 124 for the acceptance of the sealing diaphragm 38. The cylindrical chamber segment 112 includes a flat ring like surface 126 for the accommodation of the actuating diaphragm 36 lying between the point of intersection of the conical chamber segment 114 with the cylindrical chamber segment 112 extending outwardly to the radius of the cylindrical chamber segment 112.

As illustrated in FIG. 3, a figure illustrating the valve in the open and actuated mode, the upper cylindrical chamber segment 110 accepts the lower portion of the cylinder housing 18. The cylindrical chamber segment 112 and conical chamber segment 114 accept the actuating diaphragm 36.

Figure 4:
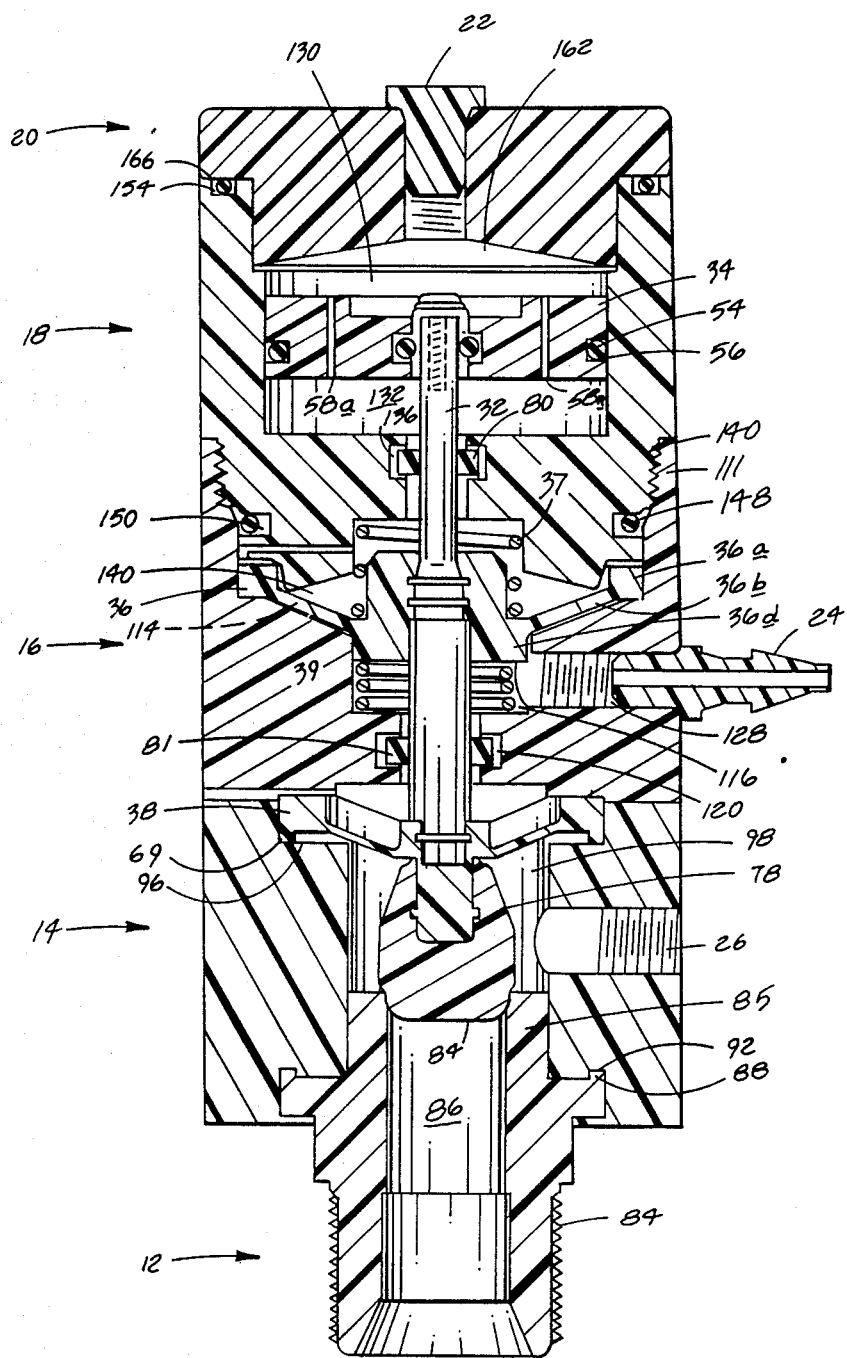
FIG. 4 illustrates a cross sectional view of the slow acting valve in the rest position; and, FIG. 5 illustrates a cross-sectional view of the double taper poppet engaging the valve seat.

In the unactuated mode, illustrated in FIG. 4, the spring chamber 16 accepts the spring 39 and the lower cylindrical member 36d. The valve stem 32 passes through the hole 118, as well as the concentric cylindrical or conical chamber segments previously described, and seals by the engagement of the quad O ring 81 with the annular groove 120. A threaded pneumatic actuating port 128 extends from the spring chamber 116 to the outer wall of the actuator housing 16, and includes a pneumatic barb 24 for connection to an external pneumatic source.

The cylinder housing 18 includes a plurality of concentric vertically spaced cylindrical or conical chamber segments including an upper cylindrical chamber segment 130 for the accommodation of the cylinder cap 20; cylindrical chamber segment 132 for accommodation of the damping piston 34; a hole 134 for the accommodation of the valve stem 32; an annular groove 136 located along the hole 134 for accommodation of the quad O ring 80 on the valve stem 32; a cylindrical chamber segment 138 for the accommodation of the upper cylindrical member 36c of the actuating diaphragm 36; and, a conical chamber segment 140 which accommodates upward movement of the actuating diaphragm 36. The outer lower portion of the cylinder housing 18 includes radiused threaded surfaces 141, 142 and 144. Radiused threaded surface 141 mates with threads 111 in the actuator housing 16. Radiused threaded surface 142 aligns in cylindrical chamber segment 112. Radiused surface 144 cants and secures the annular seal 36a against the flat ring like surface 126 in conjunction with the flat ring like surface 146. An O ring 148 in an annular ring 150 seals against the walls of the cylindrical chamber segment 112. An additional O ring 152 positions in groove 154 in the upper portion of the cylindrical housing to seal against the cylinder cap 20.

The cylinder cap 20 includes a threaded barb plug 22 which secures into a threaded hole 160 in the center of the cylinder cap 20. The under side of the cylinder cap 20 includes a domed segment 162, a cylindrical member 164 which mates with the cylindrical chamber segment 130, and a shouldered surface 166 which mates against the O ring 152 in the upper surface of the cylinder housing 18.

FIG. 3 illustrates a cross-sectional View of the slow acting valve in the actuated position where all numerals correspond to those elements previously described.

FIG. 4 illustrates a cross-sectional View of the slow acting valve in the relaxed position where all numerals correspond to those elements previously described.

Figure 5:
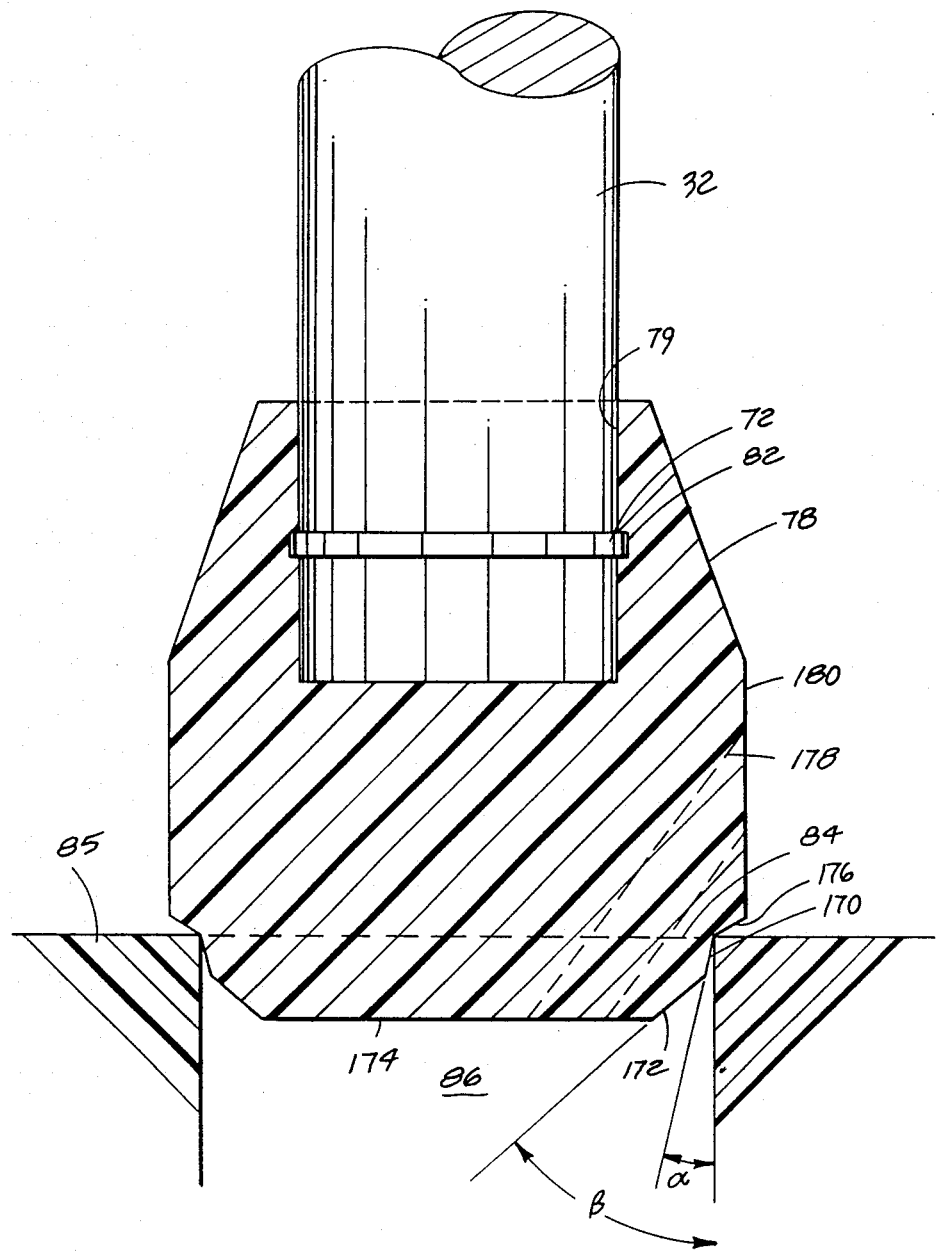

FIG. 5 illustrates the double taper poppet 78 where all numerals correspond to those elements previously described. Illustrated in particular is the double taper poppet 78 which provides an extremely low angle of incidence to the circular valve seat 84. The taper 170 offers a low angle of incidence with walls of the valve seat passageway 86 upon initial retraction of the poppet from the circular valve seat 84. Subsequent to the controlled lifting of double taper poppet 78 from the circular valve seat 84, a larger angle of incidence between the second taper 172 and the walls of the valve seat passageway 86 incurs, allowing for an increased rate of build up of system pressure after taper 170 has been lifted away from the valve seat 84. Flow is then allowed to increase at a greater rate as the bottom surface 174 is moved past the valve seat 84. In the valve closed position, fluid flow is normally stopped by the seating of a third canted surface 176 against the valve seat 84. An optional vent hole 178 traverses through the double taper poppet 78 from the bottom surface 174 to the poppet side 180.

MODE OF OPERATION

FIG. 3 best illustrates the mode of operation of the pneumatic or gas actuated slow acting valve 10. Reference can also be made to the other accompanying drawings. Pressurized gas or gas from an external source is delivered to the barb 24 and passes through the threaded pneumatic actuating port 128 and through the spring chamber 116 to apply pressure to the under side of the actuating diaphragm 36 to force the actuating diaphragm 36 upwardly against the pressure of spring 37. The actuating diaphragm 36 moves the rigidly attached valve stem 32 vertically upward. The motion of the valve stem 32 is dampened by action of the damping piston 34 in the upper cylindrical chamber segment 132. Hydraulic fluid in the upper cylindrical chamber segment 132 is metered from the portion of the upper cylindrical chamber segment 132, above the damping piston 34, through the plurality of restrictor orifices 58a–58n, to the portion of the upper cylindrical chamber segment 132, and below the damping piston; thus restricting and controlling movement of the damping piston 34, and consequently the motion of the valve stem 32 and the double taper poppet 78. The O ring 54 in the damping piston 34 provides a positive seal. Controlled flow between the valve seat 84 and the double taper poppet 78 is described in FIG. 5. At first, due to the low angle of incidence, a minimal or small amount of fluid being controlled between lower orifice 28 and threaded orifice 26 is allowed to flow at a very slow pressure build up rate, which is slowly increased as taper 170 is disengaged from the valve seat 84. The pressure build up rate is increased at a greater rate due to the larger angle of incidence as taper 172 nears the valve seat 84. With valve closure, the damping piston controls poppet movement. The pressure is first slowed somewhat when the taper 172 nears and passes by the valve seat 84, and is slowed by an even lesser finite rate when the taper 170 comes in proximity with the valve seat 84. When pneumatic air or pressurized gas pressure is removed from barb 24, the compressed spring 37 between the actuating diaphragm 36 and the upper surface of the cylindrical chamber segment 138 returns the actuating diaphragm, the valve stem 32 and the poppet return to the position as illustrated in FIG. 4 as just described.

Quad O ring 81 and the sealing diaphragm 38 provide for a double seal between the valve seat housing 14 and associated components, and the actuating pressure found in the actuator housing 16. Pressure from the actuator housing 16 is also double sealed from the cylinder housing 18 and associated components by quad O ring 80 and the actuating diaphragm 36.

The slow acting valve is particularly suited for clean room environment applications due to particle free construction and operation, and is also suitable for use in ultra clean flow systems due to the shock limiting and minimizing features.

Various modifications can be made to the present invention without departing from the apparent scope hereof.

I claim:

1. Slow acting pneumatically actuated fluid valve comprising:
    a. threaded valve seat assembly including threads on a lower portion, a circular valve seat and a valve seat passageway therein to a lower orifice;
    b. valve seat housing including a side orifice and upper and lower annular grooves about a passageway;
    c. actuator housing including an actuating diaphragm seat, a sealing diaphragm seat, a spring chamber therebetween, and a hole for the valve stem;
    d. cylinder housing including a chamber for accepting the cylinder cap, a chamber for the damping piston, and a hole for the valve stem;
    e. cylinder cap including a domed segment in the lower portion and a cylindrical chamber segment which mates with said cylindrical chamber housing; and,
    f. valve stem assembly including a valve stem, a damping piston at an upper portion of said stem, an actuating diaphragm on a midportion of said stem, a sealing diaphragm on a lower portion of said stem, a double tapered poppet on a lower end of said stem connected to a portion of said sealing diaphragm for sealing and unsealing said valve seat for modifying changes in the fluid flow rate between the poppet and valve seat at two levels dependent upon the proximity of the poppet to the valve seat, a first spring about said stem between said actuating diaphragm and said sealing diaphragm and disposed within said actuator housing, and a second spring between said damping piston and actuating diaphragm and disposed with said actuator housing and said cylinder housing whereby said actuator housing receives a pneumatic pressure for moving said diaphragm, thereby causing the actuation speed of said valve to be slow and uniform throughout the entire movement of said fluid valve and thereby reducing fluid shock.

2. Valve of claim 1 wherein said piston, said actuating diaphragm, said sealing diaphragm and said poppet are of fluorocarbon.

3. Valve of claim 1 wherein said double taper poppet includes a low angle of incidence with respect to the valve seat.

4. A slow-acting pneumatically operated fluid valve for semiconductor fabrication equipment, the valve being designed to minimize fluid supply system shocks that can dislodge particles within the supply system and contaminate components of the semiconductor fabrication equipment when the valve is opened or closed, comprising:
    a sealed axially aligned multi-part valve enclosure including a valve seat housing, an actuator housing a cylinder housing, and a cylinder end cap;
    an elongated valve stem movably mounted in the actuator housing of the valve enclosure for axial movement relative to it;

a first sealed chamber formed within the actuator housing of the valve enclosure, the first sealed chamber being axially bounded by first and second diaphragms each having a rim sealed to the valve enclosure and a central section sealed and fixed to the valve stem at axially spaced positions along its length, the rim of the first diaphragm being sealingly disposed between the valve seat housing and the actuator housing and the rim of the second diaphragm being sealingly disposed between the actuator housing and the cylinder housing;

fluid inlet means formed through the actuator housing of the valve enclosure in communication with the first sealed chamber for selectively directing fluid under pressure into the first sealed chamber to move the valve stem in a first axial direction relative to the valve enclosure;

at least one biasing means within the actuator housing of the valve enclosure, the biasing means being operably connected between the valve enclosure and valve stem for urging the valve stem in an axial direction opposite to the first axial direction;

a poppet at one axial end of the valve stem;

a valve seat formed within the valve seat housing of the valve enclosure and axially facing the poppet, the valve seat being in fluid communication between first and second ports extending through the valve seat housing of the valve enclosure;

a second sealed chamber formed in the cylinder housing of the valve enclosure, the second sealed chamber being bounded at one axial end by one of the first and second diaphragms; and the cylinder cap being fixed to the cylinder housing to close off the second sealed chamber;

damping piston means fixed to the valve stem within the second sealed chamber inn the cylinder housing for restricting and controlling axial movement of the valve stem relative to the valve enclosure;

whereby the actuation speed of the valve stem, in response to pressure of fluid directed into the first sealed chamber overcoming the biasing means, is slow and uniform throughout the entire movement of the valve stem.

5. The slow-acting fluid valve of claim 4 wherein the damping piston means is fixed to the valve stem at its remaining axial end.

6. The flow-acting fluid valve of claim 4 wherein the poppet is mounted to the remaining one of the first and second diaphragms.

7. The slow-acting fluid valve of claim 4 wherein the poppet has an outwardly facing end bounded by a first taper having a low angle of incidence relative to the valve seat and a second taper having a larger angle of incidence, whereby fluid flow between the first and second fluid ports through the valve seat is increased at a greater rate as the poppet is axially positioned outward from the valve seat by movement of the valve stem.

* * * * *